W. P. HALE.
Circular-Saws.

No. 149,748.            Patented April 14, 1874.

WITNESSES:

INVENTOR

UNITED STATES PATENT OFFICE.

WILLIAM P. HALE, OF BROCKPORT, NEW YORK.

IMPROVEMENT IN CIRCULAR SAWS.

Specification forming part of Letters Patent No. 149,748, dated April 14, 1874; application filed March 27, 1874.

*To all whom it may concern:*

Be it known that I, WM. P. HALE, of Brockport, in the county of Monroe and State of New York, have invented certain new and useful Improvements in Circular Saws; and I do hereby declare that the following is a full, clear, and exact description thereof, reference being had to the accompanying drawings and to the letters of reference marked thereon, which form part of this specification.

The nature of my invention consists in the construction of a circular saw, as will be hereinafter more fully set forth.

In order to enable others skilled in the art to which my invention appertains to make and use the same, I will now proceed to describe its construction and operation, referring to the annexed drawing, in which—

Figure 1:
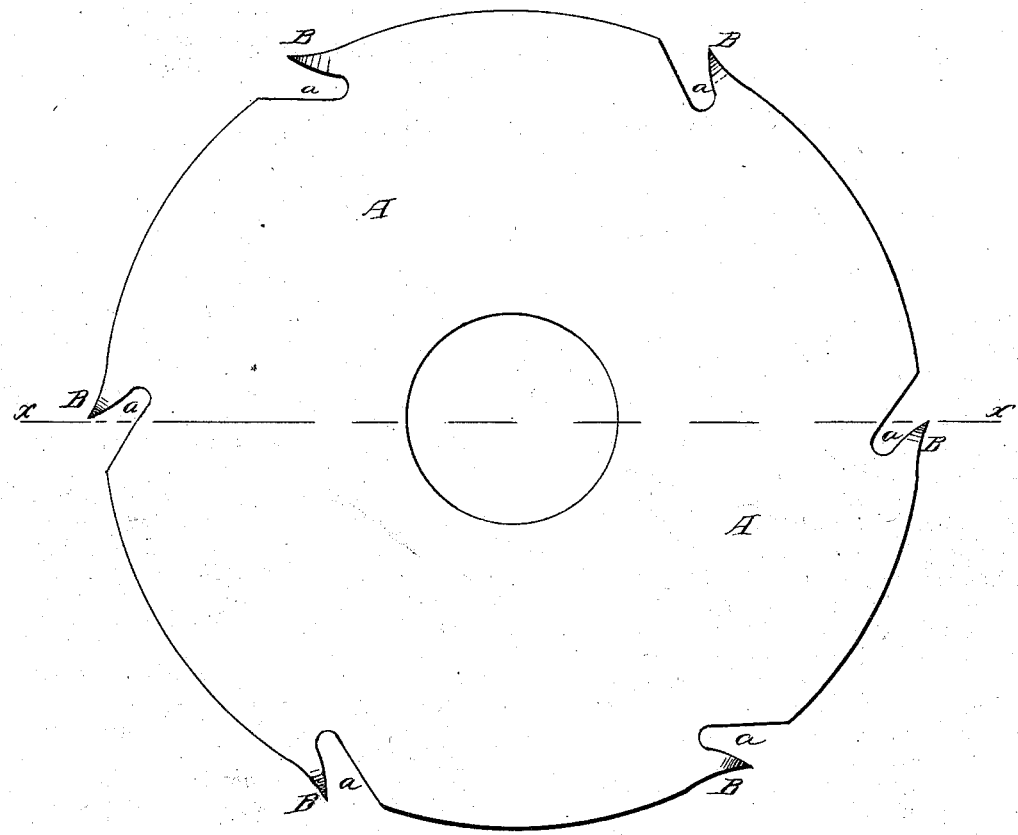
Figure 2:

Figure 1 is a plan view, and Fig. 2 a central vertical section on line $x\ x$.

A represents the circular saw-plate, which is ground or made hollowing on one or both sides, so as to make it thinner at the center edge than it is at the outer edge, for the purpose of clearing the lumber to get rid of friction, and also to run with less set in the saw, and thereby save lumber and power. The saw-plate is made on a true circle, with notches $a\ a$ cut in the edge to form the teeth, whereby the saw is kept the full size until each tooth is worn back to the next tooth, causing the saw to last many times as long as the ordinary saw.

In a forty-four-inch saw I make only eight teeth, seventeen and one-fourth inches apart. The teeth B B are swaged or bent outward beyond the circle of the saw to form the cut.

Having thus fully described my invention, what I claim as new, and desire to secure by Letters Patent, is—

A circular saw-plate, A, having one or both sides ground or made hollowing, so as to be thinner at the center than at the outer edge, for the purposes herein set forth.

In testimony that I claim the foregoing as my own I affix my signature in presence of two witnesses.

WILLIAM P. HALE.

Witnesses:
 R. CHICKERING,
 A. P. BUTTS.